United States Patent [19]

Rhodes et al.

[11] 4,264,779

[45] Apr. 28, 1981

[54] POKE-THROUGH ELECTRICAL FITTING WITH RELEASABLE WEDGING POINT FOR RETENTION

[75] Inventors: Thomas R. Rhodes; Joseph A. Claborn, both of Tulsa; George L. Woods, Morris, all of Okla.

[73] Assignee: General Signal Corporation, Stamford, Conn.

[21] Appl. No.: 952,753

[22] Filed: Oct. 19, 1978

[51] Int. Cl.³ .............................................. H02G 3/22
[52] U.S. Cl. ........................................ 174/48; 52/221
[58] Field of Search ....................... 174/48, 49; 52/221; 85/35 R, 35 K, 74; 292/256.75

[56] References Cited

U.S. PATENT DOCUMENTS

| | | | |
|---|---|---|---|
| 2,616,327 | 11/1952 | Karitzky | 85/3 S |
| 2,916,540 | 12/1959 | Rostan | 174/48 |
| 3,751,576 | 8/1973 | Klinkman et al. | 174/48 |
| 3,794,826 | 2/1974 | Jablonski | |
| 3,803,341 | 4/1974 | Klinkman et al. | 174/48 |
| 3,995,102 | 11/1976 | Kohaut | 174/48 |
| 4,074,941 | 2/1978 | Jablonski | 85/3 S |
| 4,091,231 | 5/1978 | Sotolongo | 174/48 |

*Primary Examiner*—B. A. Reynolds
*Assistant Examiner*—D. A. Tone

*Attorney, Agent, or Firm*—Milton E. Kleinman; George W. Killian

[57] ABSTRACT

A poke-through electrical fitting device for placement in a passageway such as a cylindrical hole through a wall, floor, or the like, which may be made of concrete or some other fire rated barrier. The fitting is designed to prevent the spread of fire from one side of the fire rated barrier to the other, to protect the conductors and to facilitate installation, by requiring minimum disassembly or assembly during the installation which may be accomplished by a single craftsman. The fitting includes a channel member through which the conductors pass. Pivotally coupled to the channel member are spring biased wing members which extend laterally and which include wedge points for binding engagement with the interior of the passageway. The wing members and wedge points may be released from the underside to facilitate removal of the fitting. A thermal barrier is included to inhibit heat transfer, and other sealing members are provided as a barrier to any products of combustion. The fitting may include a divider to allow multiple classes of wiring. A sliding collar assembly may be used at the lower end of the fitting to provide an auxiliary fire barrier at the lower limit of the passageway or hole.

20 Claims, 6 Drawing Figures

POKE-THROUGH ELECTRICAL FITTING WITH RELEASABLE WEDGING POINT FOR RETENTION

BACKGROUND OF THE INVENTION

In commercial, manufacturing and office buildings, there is a frequent need to change, add or modify wiring to accommodate changing circumstances. The electrical fitting described herein is designed for use in situations wherein it is necessary to pass electrical conductors through a wall, floor or the like which may be fabricated of concrete or similar material to provide the required strength and/or to serve as a fire barrier. Sometimes the necessary holes or openings are provided as the concrete is originally poured and sometimes the necessary passageways are obtained by drilling. It is common practice to provide a junction box on one side of the passageway and another junction box, or an appropriate outlet, switch or other device on the other side of the barrier.

A wide variety of devices have been developed and employed to satisfy the variety of circumstances to be accommodated. Examples of prior art structures include U.S. Pat. Nos. 3,803,341 and 3,995,102 issued Apr. 9, 1974 to Klinkman and Nov. 30, 1976 to Kohaut, respectively. While these devices serve as described in their respective specifications, it will be seen that the present device affords various advantages in economy, features, ease of installation, and convenience in removal when and if required. In addition, the present device provides an effective barrier to products of combustion before, during and after a fire.

SUMMARY OF THE INVENTION

The structure of the present invention comprises an electrical fitting, all components of which may be completely assembled at the factory and quickly and conveniently inserted in a passageway through a concrete floor, or wall, by a single craftsman. The hole or passageway through the floor may have any shape, although it is anticipated that in the usual application the passageway will comprise a cylindrical hole. The electrical fitting comprises a channel assembly having a cross-sectional area which is of the order of one-half the cross-sectional area of the passageway through the floor. Coupled to the channel assembly is a pair of spring biased wing members which carry wedge points on their remote ends. As the fitting is inserted into the passageway, the wing members are deflected and the wedge points slide along the interior wall of the passageway. Because of their design and angular orientation, the wedge points bear against the interior of the passageway and inhibit removal of the device. Notwithstanding this locking feature, the device may be conveniently and economically removed from the passageway by the insertion of a releasing tool from the opposite side of the passageway to disengage the spring wing members from contact with the interior wall of the passageway.

The design includes a thermal barrier to inhibit the conduction of heat through the passageway. In addition, upper and lower sealing members may be provided which may be resilient and which are fire resistant and expand in the presence of temperatures that may be expected in the event of a fire. Accordingly, these sealing members serve to prevent the passage of the products of combustion through the passageway before, during or after a fire.

It is an object of the present invention to provide a new and improved electrical fitting for insertion within a passageway that has been formed in a fire rated barrier such as a floor, wall or the like.

It is a more specific object of this invention to provide an electrical fitting of the class described which may be conveniently and economically installed by a single craftsman.

It is another object of the invention to provide an electrical fitting of the class described which may be installed with minimum assembly and/or disassembly of components prior to insertion.

It is another object of the invention to provide an electrical fitting which is self-securing within the passageway.

It is another object of the invention to provide an electrical fitting of the class described which may be easily and conveniently released for removal.

It is another object of the invention to provide a fitting of the class described which provides a barrier to the transmission of products of combustion through the passageway before, during and after a fire.

Other objects, advantages and features of the present invention will become more apparent as the following specification is considered together with the accompanying drawings.

In the drawings and the specification, a preferred embodiment of the invention is shown and described. However, it should be understood that these are for the purposes of illustration and do not limit the invention which is defined by the appended claims.

Elements which appear in multiple figures are always given the same identifying number.

DESCRIPTION OF THE PREFERRED EMBODIMENT

Figure 1:
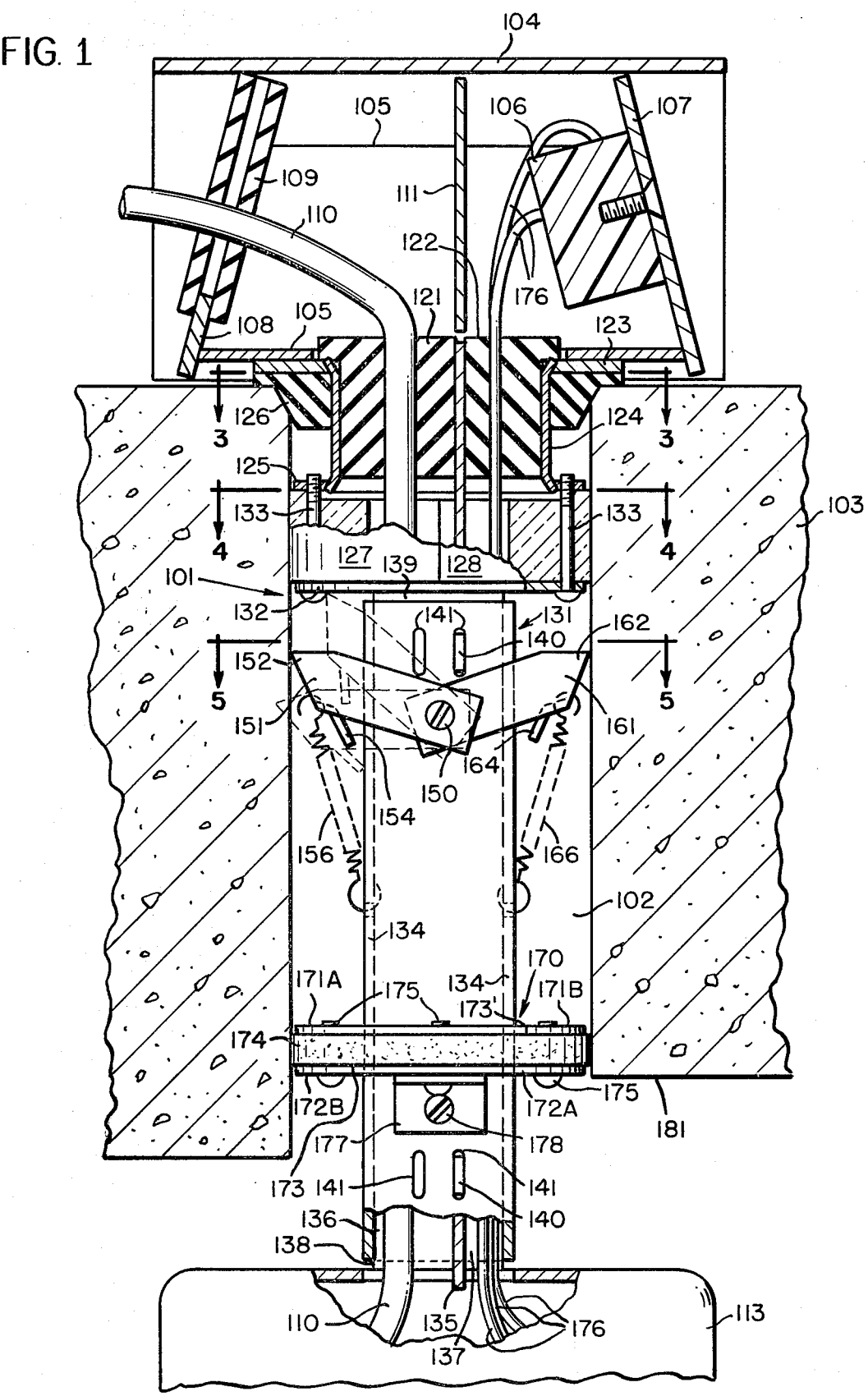
FIG. 1 comprises a view, partially in cross section and partially cut away, showing the insert device placed within a passageway through a concrete floor.

Referring now more specifically to FIG. 1, there will be seen therein a poke-through electrical fitting having releasable wedging points for retaining the fitting 101 within a passageway and which is designated generally as 101. The electrical fitting 101 has been poked through a hole 102 in a floor 103. The floor 103 is shown as being made of concrete. However, it should be understood that this is illustrative only and that the floor 103 could be fabricated of any other suitable material (usually a fire rated barrier) such as stone, brick, or other material. Furthermore, while the electrical fitting 101 is illustrated as poked through a hole in a floor, it is to be understood that the fitting 101 could be used in walls, ceilings, or other barriers. For this description, the barrier 103 will be referred to as a floor made of concrete. The floor 103 may be made of uniform thickness, or nonuniform thickness, as illustrated in FIG. 1. The floor 103 may have its upper surface covered with any suitable floor covering if desired. Such covering is not illustrated in FIG. 1 as such floor covering is optional and not required for the proper operation of the electrical fitting 101. The hole 102 in the floor 103 may be produced by any convenient means including drilling or use of a form during the pouring of the floor 103. Furthermore, while the hole 102 will most conventionally have a circular cross section it should be understood that the hole 102 may have some other shape and that the fitting 101 and/or components associated therewith may be fabricated to function with holes other than cylindrical.

Figure 2:
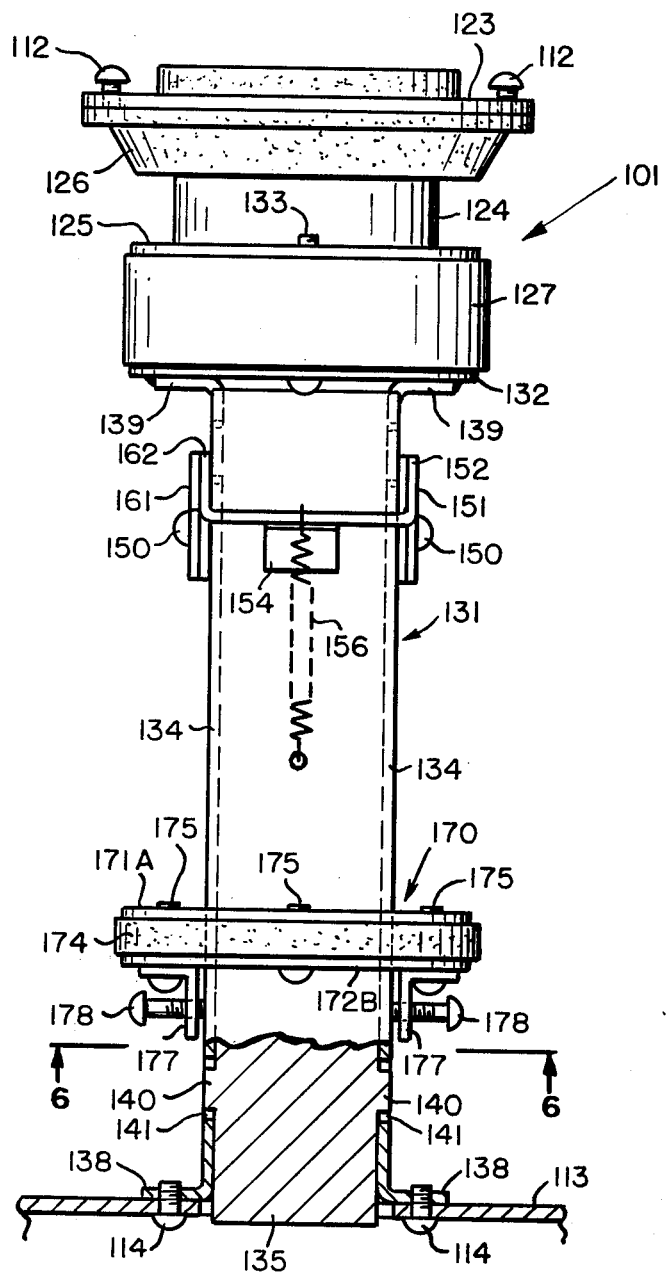
FIG. 2 comprises a side view of the essential components of the fitting with some parts cut away for clarity.

The electrical fitting 101 will be seen to comprise numerous components including a cover 104 which covers an outlet box 105 having coupled thereto an electrical outlet 106 and associated coverplate 107, a plate 108 and grommet 109 for accommodating a telephone or signalling cable 110. A divider 111 divides the space within the outlet box 105 into two compartments for segregating and isolating the wiring in accordance with electrical code requirements. The outlet box 105 is coupled to the fitting 101 by means of screws 112 which are shown in FIG. 2. Coupled to the bottom of the fitting 101 is a junction box 113 which is coupled to the fitting 101 by screws 114.

Figure 3:
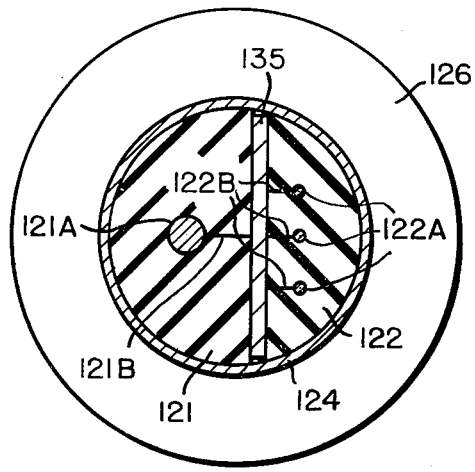
FIG. 3 comprises a cross section view taken on the line 3—3 of FIG. 1.

FIGS. 1 and 2 comprise cross section and/or partial break away views of the fitting 101 with FIG. 1 comprising a front view and FIG. 2 a side view. The fitting 101 includes a seal which comprises first and second portions 121 and 122 and which is also shown in FIG. 3 and which is to be described more fully hereinafter. The structure includes a collar ring 123, a collar sleeve 124 and a collar washer 125 which may comprise a separate subassembly.

Figure 4:
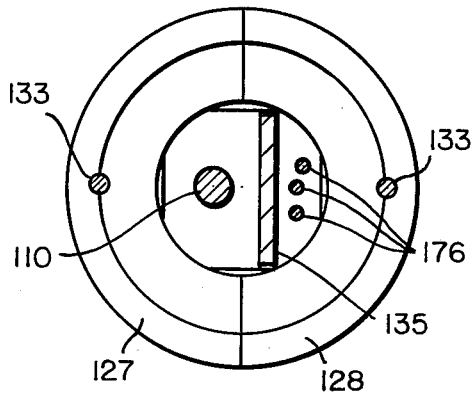
FIG. 4 comprises a cross section view taken on the line 4—4 of FIG. 1.

Surrounding the collar sleeve 124 is a seal 126. Coupled to the collar washer 125 is a collar assembly preferably constituting a thermal barrier comprising first and second parts 127 and 128 which are more clearly shown in FIG. 4. Below the thermal barrier 127 and 128 is a channel member indicated generally as 131 which is coupled to an upper plate 132. The collar washer 125 and upper plate 132 are coupled by screws 133 with the thermal barrier 127 and 128 therebetween. Secured to the upper plate 132 are the main members of the channel member 131 comprising walls 134. Within the passageway formed by the walls 134 is a divider 135 which divides the interior of member 131 into first and second passageways 136 and 137 which may be most clearly seen in FIG. 5. As may be most clearly seen in FIG. 1, the divider 135 extends the entire length of the channel member 131 and through the thermal barrier 127, 128 and separates the two portions of the seal 121, 122 and is substantially co-planar with the divider 111. The walls 134 include lower flange members 138 (FIG. 2) to provide for coupling of the junction box 113. The walls 134 also include upper flanges 139 for coupling the channel member 131 to the upper plate 132. The divider 135 is retained in the channel member 131 by means of tongues 140 which project through slots 141 in the walls 134.

Figure 5:
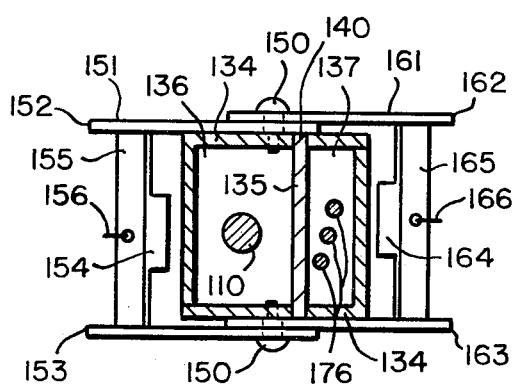
FIG. 5 comprises a cross section view taken on the line 5—5 of FIG. 1.

Coupled to the walls 134 are spring wing members 151 and 161 which may be seen more clearly in FIG. 5. The spring wing members 151 and 161 are coupled to the walls 134 by screws 150, or other suitable fastening means which provide for pivotal action of the spring wing members 151 and 161 about the fastener 150. The spring wing members 151 and 161 each include a pair of wedge points 152, 153 and 162, 163, respectively. Each spring wing member 151 or 161 includes a backstop 154 or 164 which is a portion of a tie bar 155 or 165, respectively. Associated with the spring wing members 151 and 161 are springs 156 and 166, respectively, for urging their respective spring wing members to rotate until their respective backstops contact the wall 134.

As may be seen in FIG. 5, the channel member 131 my be conveniently manufactured from two L-shaped members which are identical and which may be coupled together by any convenient fashion including interlocking tabs and grooves, brazing or any other suitable means. As may be most clearly seen by consideration of FIGS. 2 and 5, the divider 135 may be retained within the channel member 131 by including tongues 140 which project through slots 141 in the walls 134. By providing a plurality of slots 141, the divider may be selectively positioned to divide the interior of the channel member 131 into separate passageways which have any desired relationship of cross-sectional area.

If it is desired that the seal 126 comprise an endless ring, it will be apparent that it should be placed over the collar sleeve 124 prior to the attachment of the last one of the collar ring 123 and the collar washer 125 to the collar sleeve 124. Obviously, the thermal barrier elements 127 and 128 could be made of a single part.

The thermal barrier 127 and 128 and the sealing members 121, 122 and 126 may be made of any suitable material which has the desired attributes. More specifically, the thermal barrier elements 127 and 128 should be fabricated of a thermal insulating material having a low thermal conductivity. The thickness of the thermal barrier 127, 128 between the collar washer 125 and the upper plate 132 may be of any suitable value which will allow the selected material to maintain the desired thermal gradient for the period and temperature differential expected. The thermal barrier 127 and 128 should, of course, be made of fire resistant materials and should not disintegrate in the presence of anticipated temperatures. The thermal barrier 127, 128 may comprise a substance which is molded or machined and may be rigid or have elastomeric qualities. The seals 121, 122 and 126 should also have a relatively low thermal conductivity, and must also have some elastomeric characteristics so that they will provide a secure seal in the assembly. Furthermore, the sealing elements 121, 122 and 126 should be fire resistant and should not disintegrate in the presence of anticipated elevated temperatures. In addition, the sealing elements should exhibit at least a limited expansion in the presence of elevated temperatures in order to enhance the quality of the seal and to maintain a seal in the event that the insulation on the wires should disintegrate. The seals 121, 122 and 126 together with the thermal barriers 127 and 128 could be made of the same material as long as the material provides the minimum requirements recited with respect to the different elements. In some applications one or more of these elements might be made of intumescent material.

Figure 6:
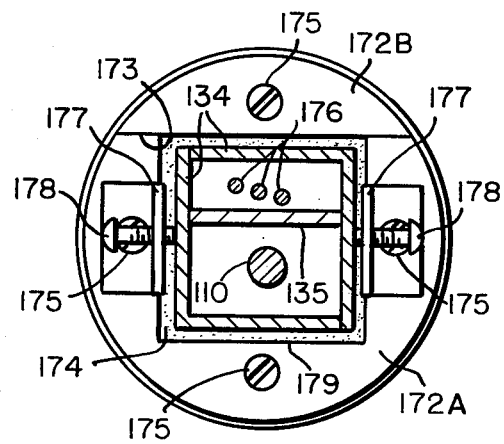
FIG. 6 comprises a cross section view taken on the line 6—6 of FIG. 2.

Under selected conditions, it may be desirable to provide an additional barrier against the transmission of smoke or other products of combustion. Such additional barrier may be located near the lower end of the channel member 131 or, more specifically, near the lower end of the hole 102. Such additional lower barrier is indicated generally in FIGS. 1 and 2 as element 170. The lower barrier 170 comprises a collar having upper and lower clamping plates each of which, as illustrated in FIGS. 1 and 6, comprise two parts. The upper clamping plate comprises parts 171A and 171B, while the lower clamping plate comprises parts 172A and 172B. The parts 172A and 172B mate at joint 173, and the parts 171A and 171B mate at joint 173'. The upper and lower plates are made of two parts as described to facilitate assembly around the channel member 131. For assembly, the joints 173 and 173' should normally be on opposite sides of the channel member 131. It will be obvious that the upper and lower plates could each comprise a single member depending upon assembly and design techniques. The upper and lower plates comprising components 171A, 171B and 172A, 172B have an outer configuration proportioned to approximately mate with the cross section of the hole 102 and a central opening 179 (see FIG. 6) which is larger than the cross section of the channel member 131. Sandwiched between the upper and lower plate elements 171A, 171B and 172A, 172B, respectively, is a thermal barrier 174 and/or sealing element which may be made of the same material as the seal 126. The upper and lower plates with the sealing material therebetween are coupled together by fastening means such as rivets or screws 175 or other convenient means. The upper and lower plates may be conveniently and economically stamped from sheet metal. As may be seen in FIGS. 1, 2 and 6, the lower plate members 172A and 172B may have an associated angle bracket 177 which could also be formed as a bent tab from the member 172A, 172B. The brackets 177 are threaded to accommodate screws 178 which, when tightened against the wall 174 will hold the lower collar assembly 170 in place. The bracket 177 is secured by screws 175 and the members 171A, 171B have tapped holes to accommodate the screws 175. It will be noted that the sealing material 174 has a central opening sized to conform with the outer dimensions of the channel member 131 and an outer configuration to closely conform with the hole 102. Any clearance between the seal 174 and the hole 102 and/or the channel member 131 will close as the seal 174 responds to heat and expands in the presence of fire. Also, the tightening of the screws 175 will tend to displace the sealing element 174 and cause it to contact the channel member 131 and hole wall to make a sealed closure.

A previously suggested design modification would permit making the upper plate 171A, 171B of a single piece. A simple design modification to accomplish this is to remove the flange 138 from the channel member 131 and form a corresponding flange on junction box 113 and provide tapped holes in the walls 134 to permit attachment of the box 113. With this modification, the lower seal assembly 170 may be slipped onto the channel member 131 at any time, including after the fitting 101 has been inserted into the hole 102.

Another design modification of the lower seal is to provide a one or two piece upper plate (elements 171A, 171B) similar to that shown in FIGS. 1 or 2 and a modified seal which is similar to seal 126 in place of the seal 174. The bottom plate would still be similar to elements 172A, 172B but would have an outer diameter greater than the hole 102. That is, the modified lower plate would have a diameter approximating that of the collar ring 123. This variation would only be used when the lower surface of the floor 103 is planar.

It will be evident that other variations may be made in selected elements to accommodate the fitting 101 to the exigencies of the specific requirements.

While it is not essential to this structure, it is anticipated that in many situations, the fitting 101 will be provided with the outlet box 105 attached thereto and with an outlet 106 and wiring 176 already in place. The wires 176 will extend through the holes 122A of the seal 122. The holes 122A have a diameter which closely approximates the diameter of the insulation on wire 176. As may be seen in FIG. 3, the holes 122A in the seal 122 are connected to the perimeter of the seal 122 by means of slits 122B. It will be apparent that to complete the assembly, the seal 122 is removed, somewhat like a cork, and the slits 122B laid open for the placement of the wires 176. At such time as a telephone cable 110 or other wiring is put in place, the seal element 121 is removed and the cable 110 laid in place by removing the seal 121, laying open the slit 121B and inserting the cable 110 into the hole 121A. A seal 121 having a hole 121A which will snugly fit the diameter of the wire 110 is used.

It will also be obvious to those familiar with devices of this class that if circumstances should require the changing of the wiring 176 or cable 110 after the fitting 101 has been installed, it will be a simple matter to remove the cover 104 and, if required, the box 105 in order to gain convenient access to the seals 121 and 122 which may be extracted to facilitate wiring or cable changes. If required, a new seal 121 and/or 122 having different sizes or numbers of holes may be used. The wiring may be pulled through the channel member 131 on the appropriate side of the divider 135 as may be required to suit the exigencies of the installation.

Considering now more specifically the installation of the electrical fitting 101 in the hole 102 of the floor 103, it will be recalled that the outlet box 105 may or may not be attached as is most convenient for the installation at hand. It should be observed that before the electrical fitting 101 is inserted into the hole 102 in the floor 103, the spring wing members 151 and 161 will be urged to the lower position as indicated by the dotted lines in FIG. 1. The springs 156 and 166 urge their respective spring wing members to the lower dotted position until the backstops 154 and 164 strike the walls 134. In this position, it will be observed that the wedge points 152, 153, 162 and 163 extend beyond the limits of the interior of the hole 102. However, as the fitting 101 is inserted into the hole, from the upper side as viewed in FIG. 1, it will be apparent that the spring wing memebers 151 and 161 yield and pivot upward although still biased downward by their respective springs 156 and 166. The fitting 101 is pushed as far into the hole 102 as it will go and until the seal 126 is appropriately seated at the junction of the upper floor surface and the hole. The springs 156 and 166 bias their respective spring wing members 151 and 161 towards the wall surface of the hole 102 and if an attempt is made to remove the fitting 101 by an upward force on any of the available components, it will be obvious that the wedge points 152, 153, 162 and 163 of the spring wing members 151 and 161 will wedge into the wall surface of the hole 102 and prevent any significant upward motion of the fitting 101. Although the springs 156, 166 are illustrated as tension springs, it will be obvious that a wide variety of springs and arrangements could be provided to bias the spring wing members 151 and 161 in the desired direction. For example, a torsion spring could be mounted under screw 150 and the spring ends proportioned to engage the tie bars 155, 165. With this arrangement, a single spring could be used.

A fitting 101 which includes therefore a lower collar assembly 170 is inserted in the same manner. After insertion, the collar 170 is slidably adjusted on the channel member 131 until the lower plate is substantially flush with the highest part 181 of the lower side of the floor 103. Thereafter, the screws 178 are tightened to bear on the walls 134 to retain the collar 170 in position.

If desired, the collar 170 may be retained at an extreme low position during insertion, and prior to the described adjustment, by sliding it downward until upper plate 171 is below at least a part of a lower hole 141, or another hole provided for this purpose, and inserting a nail through the hole to restrict the upward motion of the collar 170 until the nail is removed. It will be obvious that the nail must have a length shorter than the diameter of the hole 102, and that the nail is to be removed prior to final adjustment of the collar 170. Alternately, the screws 178 may be tightened prior to insertion of the fitting 101.

It should be observed that no disassembly of the fitting 101 was required to permit insertion of the fitting 101 into the hole 102 and that the installation can be made by a single craftsman working on one side of the floor 103 and that retention of the fitting 101 does not depend upon any adjustments or modifications made from the underside of the floor 103.

If it is desired to remove a fitting 101 that has been put in place, such removal may be accomplished simply and economically without any damage to parts thereof. In order to accomplish removal of the fitting 101, the craftsman would go to the underside of the floor 103 and insert a suitable instrument into the hole 102 to contact the backstops 154, 164 and/or the tie bars 155, 165 to pivot the spring wing members 151 and 161 upward from their solid line position and towards the upper dotted line position. The pivoting may be facilitated by providing the upward force on the tool to cause the pivoting while simultaneously providing a downward force on the channel member 131 in any convenient fashion such as by grasping the flange 138. With the spring wing members 151 and 161 pivoted so that their wedge points 152, 153, 162 and 163 do not contact the interior wall of the hole 102, it is a simple matter to hold the spring wing members in the released position and push the entire fitting 101 upward until the spring wing members 151 and 161 are above the floor surface. When desired, the fitting 101 may be reinserted into the hole 102 in the manner previously described.

To remove a fitting 101 which includes a lower seal 170, the screws 175 and 178 should be loosened and the seal 170 dropped to its lowest position.

Subsequent to the placement of the fitting 101 within the hole 102, the junction box 113 may be coupled to the flanges 138 by the screws 114. In normal practice, the junction box 113 would include a divider (not shown) which is co-planar with the divider 135 and which serves to provide separate compartments in the junction box 113 for the wiring 176 and the cable 110. Appropriate connections are made to the wires 176 and/or cable 110 to complete the installation.

It will be obvious that many modifications can be made in the structure shown. For example, a simple detent mechanism could be substituted for the bracket 177 and screws 178. Other modifications will readily occur to those skilled in the appropriate arts and which may facilitate manufacture of the fitting with available materials and tools.

While there has been shown and described what is considered at the present to be a preferred embodiment of the invention, modifications thereto will readily occur to those skilled in the arts. For example, in addition to the modifications already mentioned, the channel member could have a round cross section or provision could be made for providing a telescoping channel member. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An electrical fitting for placement in a passageway through a floor, or the like, to protect conductors and prevent the passage of products of combustion through said passageway and comprising in combination:
   (a) a channel assembly having a longitudinal axis and upper and lower ends;
   (b) an upper collar assembly coupled to said upper end of said channel assembly and having a cross-sectional area of the order of twice that of said channel assembly;
   (c) a lower collar assembly slideably coupled to said channel assembly and having an outer configuration proportioned to conform with that of said upper collar assembly;
   (d) a pair of complementary wing members pivotally coupled to said channel assembly intermediate of said upper and lower collar assemblies;
   (e) said wing members each including a wedge point at the end remote from said channel assembly and capable of extending radially from said channel assembly beyond the outer limits of said collar assemblies and wherein
   (f) in response to said wedge points contacting a surface parallel to said longitudinal axis, said wedge points and wing members cooperate to inhibit longitudinal motion of said fitting in one direction only.

2. The combination as set forth in claim 1, wherein said wing members each include a stop member for limiting the pivotal motion of the associated wing member in one direction.

3. The combination as set forth in claim 2, wherein said stop members limit the pivotal motion of the associated wing member at a point wherein said wedge points are positioned beyond the outer limits of said collar assembly.

4. The combination as set forth in claim 3 and including spring bias means for urging said wing members to pivot in a first direction.

5. The combination as set forth in claim 4, wherein said spring bias means urges said wing members to pivot in said first direction until limited by said stop members.

6. The combination as set forth in claim 5, wherein said collar assembly constitutes a thermal barrier.

7. The combination as set forth in claim 6 and including a collar sleeve coupled to said collar assembly on the upper side of said collar assembly; and
   (a) a collar ring which is generally planar and which is coupled to the upper end of said collar sleeve and which extends further from said longitudinal axis than said collar assembly.

8. The combination as set forth in claim 7 and including a first elastomeric seal positioned to contact said collar sleeve and said collar ring for providing a first barrier to products of combustion.

9. The combination as set forth in claim 8 and including a second elastomeric seal positioned within, and in contact with, said collar sleeve for providing a second barrier to products of combustion.

10. The combination as set forth in claim 9, wherein said second elastomeric seal includes a penetration for accommodating a conductor.

11. The combination as set forth in claim 10, wherein said second elastomeric seal is divided into first and second parts.

12. The combination as set forth in claim 11 and including a longitudinal divider positioned within said channel assembly for dividing it into two compartments and extending through said thermal barrier, said collar sleeve and said collar ring and wherein said first and second parts of said second elastomeric seal are on opposite sides of said divider.

13. The combination as set forth in claim 1, wherein said lower collar assembly includes a thermal barrier.

14. The combination as set forth in claim 13 and including selectively adjustable inhibiting means for inhibiting said lower collar assembly from sliding with respect to said channel assembly.

15. The combination as set forth in claim 14, wherein said inhibiting means may inhibit said lower collar assembly from sliding with respect to said channel assembly by selectively securing said lower collar assembly to said channel assembly at any one of a plurality of selectable positions.

16. The combination as set forth in claim 15, wherein said channel assembly includes means for inhibiting the removal of said lower collar assembly from said channel assembly.

17. The combination as set forth in claim 1 and including limit means for, at least temporarily, limiting the maximum upward movement of said lower collar assembly with respect to said channel assembly.

18. The combination as set forth in claim 17, wherein said limit means is selectively adjustable and can limit both the upward and downward movement of said lower collar assembly with respect to said channel assembly.

19. The combination as set forth in claim 18, wherein said limit means comprises a tab portion coupled to said lower collar assembly and an associated screw.

20. The combination as set forth in claim 17, wherein said limit means includes a removable barrier member inserted through said channel assembly.

* * * * *